United States Patent

Hergenrother et al.

[11] 4,243,796
[45] Jan. 6, 1981

[54] POLYPHOSPHAZENE POLYMERS CONTAINING SUBSTITUENTS DERIVED FROM ALDEHYDES OR KETONES

[75] Inventors: William L. Hergenrother, Akron; Adel F. Halasa, Bath, both of Ohio

[73] Assignee: The Firestone Tire & Rubber Company, Akron, Ohio

[21] Appl. No.: 941,108

[22] Filed: Sep. 8, 1978

[51] Int. Cl.$^3$ .............................................. C08L 83/00
[52] U.S. Cl. .................................. 528/224; 528/126; 528/128; 528/146; 528/158; 528/228; 528/243; 528/244; 528/266; 528/399
[58] Field of Search ............... 528/399, 168, 157, 126, 528/128, 228, 243, 244, 224, 127

[56] References Cited

U.S. PATENT DOCUMENTS 3,702,833  11/1972  Rose et al. ........................... 528/399
4,040,843  8/1977  Franko-Filipasic et al. ..... 106/15 FP

*Primary Examiner*—Wilbert J. Briggs, Sr.

[57] ABSTRACT

Polyphosphazene copolymers are prepared which are comprised of repeating units represented by the formulas:

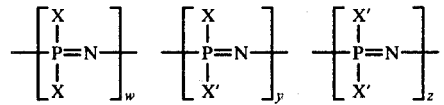

wherein X is represented by the formula:

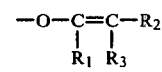

wherein $R_1$, $R_2$ and $R_3$ are independently selected from the group consisting of hydrogen, substituted and unsubstituted alkyl radicals containing from 1 to 15 carbon atoms, substituted and unsubstituted cycloalkyl, aryl, arylalkyl, and heterocyclic radicals; X' is selected from the group consisting of substituted and unsubstituted alkoxy, aryloxy, mercapto and amino radicals, and mixtures thereof; and $20 \leq (w+y+z) \leq 50,000$ per polymer unit.

The polyphosphazene polymers of the present invention are prepared by the reaction of the enol form of an aldehyde or a ketone and an additional reactant such as an alkanol, aryl alcohol, mercaptan, or amine with poly(dichlorophosphazene) in the presence of a tertiary amine. The polymers of this invention may be modified by crosslinking or curing.

The polymers of this invention can be utilized to form protective films and may also be utilized in applications such as molding, coatings, foams and the like.

8 Claims, No Drawings

POLYPHOSPHAZENE POLYMERS CONTAINING SUBSTITUENTS DERIVED FROM ALDEHYDES OR KETONES

BACKGROUND OF THE INVENTION

Alkenoxy groups have been disclosed as substituents on polyphosphazene polymers in U.S. Pat. No. 3,702,833 to Rose et al. The Ross patent shows the preparation of these polyphosphazene copolymers through the reaction of at least two different alkali metal fluoroalkoxides and a small percentage of an alkali metal alkylene alkoxide with a soluble polymer of phosphonitrilic chloride in benzene. Disclosed substitution groups include

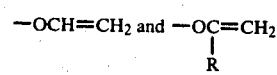

which are substituted by the reaction of their alkali metal salts with polyphosphonitrilic chloride. While the polymers produced in U.S. Pat. No. 3,702,833 appear to be within the scope of the present invention the method of preparation of the alkylene alkoxy polyphosphazene as set forth in U.S. Pat. No. 3,702,833 using the alkali metal salt substitution procedure produces a polymer having characteristics substantially different than the polymer produced in the present invention. The substitution method used in U.S. Pat. No. 3,702,833 promotes the condensation of aldehydes and ketones and results in the production of a polymer in the form of an undefined tarry mass.

Polyphosphazene polymers containing repeating

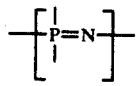

units in which various substituted and unsubstituted alkoxy, aryloxy, amino and mercapto groups are attached to the phosphorus atom and their method of preparation are described in the prior art as illustrated in the publication "Nitrogen-Phosphorus Compounds", Academic Press, New York, N.Y., 1972 by H. R. Allcock and "Poly(Organophosphazenes)", Chemtech, Sept. 19, 1975 by H. R. Allcock and in such U.S. Pat. Nos. as 3,515,688; 3,702,833; 3,856,712; 3,974,242, and 4,042,561 the disclosures of which are herein incorporated by reference.

SUMMARY OF THE INVENTION

This invention relates to polyphosphazene copolymers containing repeating

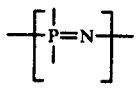

units in the polymer chain in which $\alpha,\beta$-alkenoxy substituents are attached to the phosphorus atom. More particularly, the present invention relates to polyphosphazene polymers having substituents derived from enol forms of aldehydes and ketones and to a method of preparing such polymers. Substituents groups such as alkoxy, aryloxy, amino and mercapto groups are additionally substituted onto the polyphosphazene polymer in addition to the alkenoxy substituents by either the method disclosed hereinafter or by prior art methods.

In accordance with the present invention, novel polyphosphazene polymers containing $\alpha,\beta$-alkenoxy substituents attached to the phosphorus atom are prepared by the reaction of the enol form of an aldehyde or a ketone with poly(dichlorophosphazene) and another substitutionally reactive compounds such as alkanols, aryl alcohols, mercaptans and amines in the presence of a tertiary amine. These polymers containing repeating units represented by the formulas:

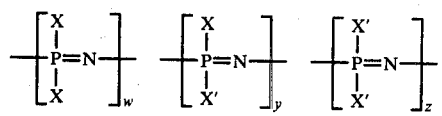

wherein X is represented by the formula:

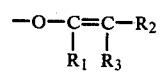

where $R_1$, $R_2$ and $R_3$ are independently selected from the group consisting of hydrogen, substituted and unsubstituted alkyl radicals containing from 1 to 15 carbon atoms, substituted and unsubstituted cycloalkyl, aryl, arylalkyl and heterocyclic radicals; X' is selected from the group consisting of substituted and unsubstituted alkoxy, aryloxy, mercapto and amino radicals, and mixtures thereof; and $20 \leq (w+y+z) \leq 50,000$ per polymer units.

In the copolymer units represented by the above formulas, all X substituent groups can be the same or they can be mixed and all X' substituent groups can be the same or can be mixed. In the mixtures, the X substituents groups can be mixtures of different $\alpha,\beta$-alkenoxy groups and the X' substituent group can be mixtures of alkoxy, aryloxy, amino and mercapto groups.

The term polymer when used in the specification will include within its meaning copolymer, that is the polyphosphazene polymer having more than one different substitution group in randomly substituted positions.

DETAILED DESCRIPTION OF THE INVENTION

The polyphosphazene polymers of the invention can be represented by the formula:

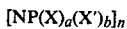

wherein n is from 20 to 50,000 and $a+b=z$ and a and b are greater than zero.

The specific proportion of X to X' substituent groups incorporated in the polymers of the invention can vary considerably depending upon chemical and physical properties desired in the polymer and the particular end use application for which the polymer is intended. Thus, for applications such as moldings, coatings, foams and the like, the polymer should contain at least 0.1 mole percent and preferably 0.5 mole percent by weight of the X substituent, the $\alpha,\beta$-alkenoxy group. This small percentage enables the polyphosphazene polymer to be crosslinked through the pendant $\alpha,\beta$-alkenoxy group or permits the substitution of a substitution group which cannot be substituted by means other than a reaction with an ethylenically unsaturated pendant group. The maximum percentage of α,β-alkenoxy groups which can be substituted onto the polymers of the present invention is approximately 70 mole percent by weight.

The α,β-alkenoxy substitution procedure of the present invention produces an α,β-alkenoxy substituted polyphosphazene polymer which is free of any undesirable condensation groups which may be formed by a reaction between tautomeric forms of the keto and enol structures upon attempted substitution by prior art methods. Therefore, only through the use of the tertiary amine substitution process can the desired non-condensated, α,β-alkenoxy substitutions be performed.

In addition, substitution of the α,β-alkenoxy groups by the procedure of the present invention permits the easy control of the amount of unsaturation introcduced into the polyphosphazene polymer within the range of 0.1 to 70 mole percent of α,β-alkenoxy per polyphosphazene polymer.

METHODS OF POLYMER PREPARATION

The polymers are prepared by reacting a poly(dichlorophosphazene) having the formula —$(NPCl_2)_n$—, in which n is from 20 to 50,000, in the presence of a tertiary amine, with a mixture of an enol form of an aldehyde or a ketone and any compound which is reactive with the poly(dichlorophosphazene) to form a substitution group on a phosphorus atom in the polyphosphazene. Examples of such compounds are discussed in the section entitled "Additional Reactive Compounds" below. Tertiary amines are not catalysts promoting the condensation of aldehydes and ketones, therefore, it is possible to react the enol form of the aldehydes and the ketones as they occur, thus forming a product, containing the desired substituents.

The polyphosphazene polymers of the present invention may also be formed by using prior art techniques to partially substitute the poly(dichlorophosphazene) with alkoxy, aryloxy, amino or mercapto groups either before or after the α,β-alkenoxy groups have been substituted on the polyphosphazene polymer using the tertiary amine process.

The polymers produced in the invention contain pendant unsaturation groups, i.e., the α,β-alkenoxy groups. The polyphosphazene polymer containing these groups may be modified by crosslinking and/or curing. The polymers may be crosslinked with suitable peroxide curing agents such as dicumyl peroxide or benzoyl peroxide. The crosslinking reactions are often run in the presence of inert, reinforcing or other fillers and the presence of these fillers should in no way be construed as falling outside the scope of this invention.

These peroxide curing agents can be used to initiate a free radical addition of substituents derived from trimethylsilane, trimethoxysilane, thiophenol or ethyl mercaptan to the α,β-alkenoxy substituent on the polyphosphazene polymer of the present invention. The free radical addition may be performed at approximately 50° C. in the presence of a suitable solvent.

The α,β-alkenoxy functionality containing polyphosphazene polymers of this invention can be used to crosslink polymers containing ethylenic unsaturation such as those which are formed from alpha, beta-ethylenically unsaturated monomers, i.e., vinyl monomers, where the unsaturated groups are reactive with the ethylenically unsaturated functionality of the polyphosphazene polymers. Examples of polymers which can be crosslinked using the polymers of the invention include vinyl interpolymers, acrylic interpolymers, styrene interpolymers and polyesters containing ethylenic unsaturation, as well as polyene interpolymers such as EPDM rubbers and butyl rubbers as well as their halogenated derivatives.

In addition, mixture of the α,β-alkenoxy containing polyphosphazene polymers and an ethylenically unsaturated monomer such as vinyl chloride, styrene, vinylidene chloride, $C_1$—$C_{12}$ alkylacrylates, and acrylonitrile can be used to form a crosslinked polymer system.

Further polymers in admixture with reactive monomers can be crosslinked with the α,β-alkenoxy containing polyphosphazene polymers. Examples include typical unsaturated polyesters with one or more reactive monomers such as vinyl esters of carboxylic acids such as vinyl acetate, vinyl butyrate, and vinyl stearate, the $C_{1-20}$ alkyl esters of acrylic and methacrylic acid such as methyl methacrylate, methyl acrylate, ethyl acrylate, butyl acrylate, 2-ethylhexyl acrylate and lauryl acrylate; aryl, halo- and nitro-substituted benzyl esters of acrylic and methacrylic acid such as benzyl acrylate and 2-chlorobenzyl acrylate; ethylenically unsaturated monocarboxylic acids such as acrylic and methacrylic acids; ethylenically unsaturated dicarboxylic acids, their anhydrides and their $C_1$—$C_{20}$ mono- and dialkyl esters such as fumeric acid, maleic acid, itaconic acid, maleic anhydride, dibutyl fumarate and monoethyl maleate, amides of ethylenically unsaturated carboxylic acids such as acrylamide and methacrylamide, vinyl aryl compounds such as styrene and alpha-methyl styrene; nitriles of ethylenically unsaturated carboxylic acids such as acrylonitrile and methacrylonitrile $C_1$—$C_{20}$ alkyl vinyl esters such as methyl vinyl ether, ethyl vinyl ether and stearyl vinyl ether; and dienes such as isoprene and butadiene.

The polymers can be used to prepare protective films and may be utilized in applications such as molding, coatings, foams and the like.

I. THE POLY(DICHLOROPHOSPHAZENE) POLYMER

The poly(dichlorophosphazene) polymers which are employed as starting materials in the process of this invention are well known in the art as illustrated in U.S. Pat. Nos. 3,370,020; 4,005,171; and 4,055,520 and the aforementioned publications of H. R. Allcock, the disclosures of which are incorporated herein by reference.

These polymers have the general formula —$(NPCl_2)_n$—, in which n can range from 20 to 50,000 or more. As described in the aforementioned references, the polymers are in general prepared by the thermal polymerization of cyclic oligomers having the formula $(NPCl_2)_m$, in which m is an integer from 3 to 7, with the cyclic trimer and tetramer often comprising up to 90% of the oligomers and the ratio of trimer to tetramer varying with the method of manufacture.

The specific conditions of temperature, pressure and time employed in the thermal polymerization of the cyclic oligomers can vary considerably depending on whether or not the polymerization is catalyzed. Thus, temperatures can range from about 130° C. to about 300° C., pressures can range from a vacuum of less than about $10^{-1}$ Torr to superatmospheric and times can range from 30 minutes to about 48 hours.

A preferred process for preparing the poly(dichlorophosphazene) polymers used in the process of this invention is described in the aforementioned incorporated U.S. Pat. No. 4,005,171.

II. THE ALDEHYDES AND KETONES WHICH ARE USEFUL IN PREPARING THE POLYMERS OF THE PRESENT INVENTION

The enol and keto forms of the aldehydes and the ketones which can be used to form the polyphosphazene polymers of the present invention are represented by the following structural formula:

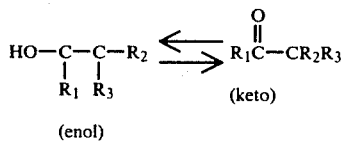

where $R_1$, $R_2$ and $R_3$ are independently selected from the group consisting of hydrogen, substituted and unsubstituted alkyl radicals containing from 1 to 15 carbon atoms, substituted and unsubstituted cycloalkyl, aryl, arylalkyl and heterocyclic radicals. It is preferred that $R_3$ be hydrogen when the $\alpha,\beta$-alkenoxy group is to serve as a crosslinking group for if $R_2$ and $R_3$ are both substitutions other than hydrogen the $\alpha,\beta$-alkenoxy group is less reactive as a crosslinking group. When $R_1$ is hydrogen the above structural formulas represent the enol and keto tautomeric forms of aldehydes, while when $R_1$ is other than hydrogen a ketone is represented by the structural formulas.

Illustrative examples of aldehydes which may be employed in producing the polymers of the present invention include alkyl containing aldehydes such as acetaldehyde, propionaldehyde, n-butyraldehyde, valeraldehyde, α-methyl-valeraldehyde, β-methyl-valeraldehyde, n-caproaldehyde, isocaproaldehyde and the like; cycloalkyl aldehydes such as cyclohexylaldehyde; aryl and arylalkyl aldehydes such as phenylacetaldehyde, 3-phenyl-propionaldehyde, o-, m- and p-methylphenylacetaldehyde and the like; and heterocyclic aldehydes such as 2-furanacetaldehyde.

Illustrative examples of ketones which may be used to prepare the polymers of the invention include: acetone, methyl ethyl ketone, methyl n-propyl ketone, methyl ethyl ketone, methyl isopropyl ketone, methyl n-butyl ketone, propyl ketone, ethyl n-propyl ketone, methyl sec-butyl ketone, methyl t-butyl ketone, methyl n-pentyl ketone, ethyl n-pentyl ketone, pentyl ketone, methyl hexyl ketone, acetophenone, n-butyrophenone benzyl methyl ketone, benzyl ethyl ketone, benzyl propyl ketone, benzyl hexyl ketone, 2-furyl methyl ketone and the like.

Preferred aldehyde compounds for preparing the polyphosphazene polymers of the invention include acetaldehyde and propionaldehyde. Preferred ketone compounds include acetone and acetophenone.

Mixtures of an aldehyde and a ketone can also be used in preparing the polymers of the invention as well as mixtures of aldehydes and mixtures of ketones.

III. ADDITIONAL REACTIVE COMPOUNDS

As indicated heretofore, the polyphosphazene copolymers of the invention in addition to the $\alpha,\beta$-alkenoxy substituent groups contain substituted or unsubstituted alkoxy, aryloxy, amino or mercapto groups or mixtures thereof.

Preferred copolymer substituent groups include: Alkoxy groups (substituted or unsubstituted) derived from aliphatic alcohols having from 1 to 20 carbon atoms such as methanol, ethanol, propanol, isopropanol, n-butanol, sec-butanol, hexanol, dodecanol and the like; fluoroalcohols, especially those represented by the formula $Z(CF_2)_nCH_2OH$ in which Z is hydrogen or fluorine and n is an integer from 1 to 10 as illustrated by trifluoroethanol, 2,2,3,3,3-pentafluoropropanol, 2,2,3,3,4,4,4-heptafluorobutanol; 2,2,3,3-tetrafluoropropanol, 2,2,3,3,4,4,5,5-octafluoropentanol, 2,2,3,3,4,4,5,5,6,6,7,7- dodecafluoroheptanol and the like. In instances where it is desired to incorporate mixed X' substituent groups in the copolymers, mixtures of the foregoing alcohols can be employed.

Aryloxy groups (substituted or unsubstituted) derived from aromatic alcohols including among others phenol; alkylphenols such as cresols, xylenols, p-, o-, and m- ethyl and propyl phenols and the like; halogen-substituted phenols such as p-, o-, and m- chloro and bromo phenols and di- or tri-halogen substituted phenols and the like; and alkoxy-substituted phenols such as 4-methoxyphenol, 4-(n-butoxy) phenol and the like. Mixtures of the foregoing aromatic alcohols can also be employed.

Amino groups derived from any of the amino compounds heretofore employed in the polyphosphazene polymer art. Thus, the amino groups may be derived from aliphatic primary and secondary amines such as methylamine, ethylamine, dimethylamine, methylethylamine and the like and aromatic amines such as those described in U.S. Pat. No. 4,042,561, as illustrated by aniline, halogen-substituted anilines, alkyl-substituted anilines, alkoxy-substituted anilines and the like.

Mercapto groups derived from any of the mercaptan compounds heretofore employed in the polyphosphazene polymer art. Thus, for example, the mercaptan compounds described in U.S. Pat. No. 3,974,242 to Lanier et al can be utilized. Representative of suitable mercaptan compounds as described in the aforementioned patent are methyl mercaptan and its homologs ethyl, propyl, butyl, aryl and hexyl mercaptans, thiophenol, thionaphthols, benzyl mercaptan, cyclohexyl mercaptan and the like.

IV. THE TERTIARY AMINE

The use of tertiary amine in preparing the polymers of the invention minimizes undesirable side reactions and at the same time acts as an effective acid scavenger.

Tertiary amines which can be employed in preparing the polymers of the invention are those represented by the general structure:

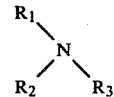

wherein $R_1$, $R_2$, and $R_3$ are alkyl containing from 1 to 8 carbon atoms. Thus, for example, the tertiary amine can be a trialkyl amine such as trimethylamine, triethylamine, tri-isopropylamine, tri-n-propylamine, tri-isobutylamine, tri-n-butylamine, and the like. In addition, tertiary amines such as pyridine and those containing diamine groups such as N,N,N',N'-tetramethylethylene diamine (TMEDA) can also be utilized.

The preferred tertiary amines for use in preparing the polymers of the invention are triethylamine, N,N,N',N'-tetramethylethylene diamine, pyridine, n-methyl morpholine, N-methyl pyrrole, 1,4-diazo-bicyclo (2.2.2) octane (DABCO) and dipiperidyl ethane.

V. PROCESS CONDITIONS

As indicated above, the polymers of the present invention are prepared by reacting the poly(dichlorophosphazene) polymer, the enol form of an aldehyde or ketone, and compounds listed in the group of "Additional Reactive Compounds" which can be substituted onto the poly(dichlorophosphazene) in the presence of a tertiary amine.

The specific reaction conditions and the proportion of ingredients employed in preparing these polymers can vary somewhat depending on factors such as the reactivity of the specific aldehyde or ketone utilized, the reactivity of the compound or compounds used to form copolymer substituents, the particular tertiary amine employed, and the degree of substitution desired in the final polymer. In general, reaction temperatures can range from about 25° C. to about 200° C. and times can range from 3 hours up to 7 days; with lower temperatures necessitating longer reaction times and higher temperatures allowing shorter reaction times. These conditions are, of course, utilized in order to obtain the most complete reaction possible, i.e., in order to insure the complete conversion of the chlorine atoms in the polymer to a corresponding ester linkage with the $\alpha,\beta$-alkenoxy substituent group as well as forming linkages with the copolymer substituents.

The above reaction is ordinarily carried out in the presence of a solvent. The solvent employed in the reaction should be a solvent for the poly(dichlorophosphazene) polymer, the aldehyde or ketone, the compounds from which the copolymer substituents are derived, and the tertiary amine. In addition, the materials in the reaction zone should be reasonably free of water.

A mixture of the aldehyde or ketone and the additional reactive compound in a predetermined molar ratio is simultaneously reacted with the poly(dichlorophosphazene) to form a copolymer. An alternative method is the stepwise addition of the aldehyde or the ketone and the additional reactive compound in any order to the poly(dichlorophosphazene) using tertiary amine, as described above, in each step, to form copolymers. The avoidance of substantial amounts of water in the reaction system is necessary in order to inhibit the premature, undesired reaction of the available chlorine atoms in the chloropolymer. Examples of suitable solvents which may be employed include diglyme, triglyme, tetraglyme, cyclohexane, chloroform, dioxane, dioxolane, methylene chloride, toluene, xylene and tetrahydrofuran. The amount of solvent employed is not critical and any amount sufficient to solubilize the reaction mixture can be employed.

In general, the amount of the combined total of the aldehyde or ketone compounds and the copolymer forming compounds reacted with the polychlorophosphazene polymer should be at least molecularly equivalent to the number of available chlorine atoms in the polymer being reacted. However, an excess of aldehydes or ketones in combination with the copolymer forming compounds be employed in order to insure complete reaction of all the available chlorine atoms.

Prior art methods of substitution of the polyphosphazene polymers as exemplified by the reaction of the sodium salt of a compound as demonstrated in U.S. Pat. No. 3,370,020 to Allcock et al have proved to be ineffective in substituting the $\alpha,\beta$-alkenoxy substituents of the present invention. Therefore, prior art methods such as disclosed by Allcock et al can be used to partially substitute the polyphosphazene polymer with substituents other than $\alpha,\beta$-alkenoxy groups followed by the substitution of $\alpha,\beta$-alkenoxy substituent groups on the remaining available sites using the tertiary amine process.

EXAMPLE 1

Preparation of $\{(CF_3CH_2O)(CH_2CHO)PN\}$-Polymer

A 10 oz. bottle was charged with 2.87 cc (51.3 millimoles) of dry acetaldehyde, 3.13 cc (51.3 millimoles) of trifluoroethanol, 12.3 cc (88 millimoles) of triethylamine, 100 cc of dry tetrahydrofuran (hereinafter THF), and 61.8 gms. (46.4 millimoles) of a 8.75 percent solids solution poly(dichlorophosphazene) in a THF solution. The materials in the bottle were heated at 80° C. for 40 hours. The materials were then subjected to Infrared spectroscopy which determined that the P-Cl bond at 600 cm$^{-1}$ was totally absent. The triethylamine hydrochloride crystals were separated from the solution. The vinyl ether containing polyphosphazene was compounded with benzoyl peroxide and after removal of solvent it cured to yield a THF insoluble product.

EXAMPLE 2

An acetaldehyde derivatized polyphosphazene was prepared as in Example 1 to contain approximately 50% mole percent of substituents containing unsaturation. One cc. of 0.06 M of a benzoyl peroxide in carbon tetrachloride was added to 10 cc. of the unsaturated polyphosphazene in a test tube. The solvent was removed from the polymer solution under vacuum at room temperature. The material in the test tube was heated in an oil bath at 112° to 120° C. for 45 minutes under a nitrogen atmosphere. The cured polyphosphazene polymer was allowed to stand in THF for three days to test solubility. The polymer was insoluble in THF and demonstrated moderate swelling. Elemental analysis of the cured, dried polymer was as follows:

|  | C | H | N | P | Cl |
|---|---|---|---|---|---|
| Actual | 23.45 | 3.83 | 8.56 | 12.82 | 1.55 |
| Calculated* | 23.48 | 3.49 | 7.02 | 13.55 | 2.26 |

*Calculated from 8.77% of Triethylamine hydrochloride, 3.49% of hydrolyzed chloropolymer and 51.54% of $\alpha,\beta$-alkenoxy derivative of polyphosphazene.

The polymer as produced in Example 2 was treated with 8.73 millimoles of styrene to produce a cured polymer which was insoluble in THF and showed only slight swelling. The polymer was further treated with 8.72 millimoles of maleic anhydride to produce a cured polymer of small gelled particles in THF.

EXAMPLE 3

The propionaldehyde derivatized polyphosphazene containing 50 mole percent of substituents containing unsaturation was prepared in accordance with the procedure of Example 1 and cured with a peroxide solution as in Example 2 to yield a polyphosphazene polymer which was insoluble in THF and showed slight swelling while having the following elemental analysis:

|  | C | H | N | P | Cl |
|---|---|---|---|---|---|
| Actual | 21.44 | 3.20 | 8.44 | 15.14 | 1.32 |

| | C | H | N | P | Cl |
|---|---|---|---|---|---|
| Calculated* | 21.45 | 3.16 | 7.66 | 15.50 | 1.64 |

*Calculated from 6.37% of TEA . HCl, 14.78% of hydrolyzed chloropolymer, 45.29% of trifluoroethanol derivatized polymer, and 20.22% of propionaldehyde derivatized polymer.

This polyphosphazene polymer was mixed with 8.73 millimoles of styrene to yield a THF insoluble product which demonstrated moderate swelling in THF. When 8.72 millimoles of maleic anhydride was added to the polymer complex the polymer took the form of small gelled particles.

EXAMPLE 4

Preparation of $\{(CF_3CH_2O)(CH_2C(CH_3)O)PN\}$- Polymer

A 10 oz. bottle was charged with 3.24 (44 millimoles) of dry acetone, 3.2 cc (44 millimoles) of trifluoroethanol, 12.3 cc (88 millimoles) of dry triethylamine, 100 cc of dry THF, and 31.4 (40 millimoles) of a 14.76 percent solution of poly(dichlorophosphazene) in THF. The bottle was heated to 80° C. in a rotary bath for 20 hours and upon cooling the insoluble triethylamine hydrochloride settled out and was separated. Infrared spectroscopy of the polymer solution showed the loss of the 600 cm$^{-1}$ band denoting the loss of P-Cl bonds, and the appearance of a 582 cm$^{-1}$ band which is characteristic of a substituted polyphosphazene. A film was cast onto glass from the polymer solution and after four days the film was insoluble in THF and water. The film was tough and adhered well to the glass substrate. When the film was allowed to stand in water some swelling occurred which was atrributed to the partial hydrolysis of the unsaturated substituent.

EXAMPLE 5

An acetophenone derivatized polyphosphazene was prepared as in Example 4 to contain approximately 50 mole percent of unsaturated substituents derived from acetophenone. The polymer was then subjected to the peroxide curing treatment of Example 2 to yield a polymer which was insoluble in THF and demonstrated little swelling. Elemental analysis of the cured, dried polymer was as follows:

| | C | H | N | P | Cl |
|---|---|---|---|---|---|
| Actual | 19.87 | 2.76 | 8.57 | 16.1 | 1.48 |
| Calculated* | 19.87 | 2.72 | 8.06 | 16.34 | 1.69 |

*Calculated for 6.58% of triethylamine hydrochloride, 20.49% of hydrolyzed chloropolymer, 59.27% of trifluoroethanol derivatized polymer and 6.95% of unsaturated derivative of polyphosphazene.

The polymer as produced in Example 5 was treated with 8.73 millimoles of styrene to yield a polymer which was insoluble and showed little swelling in THF.

EXAMPLE 6

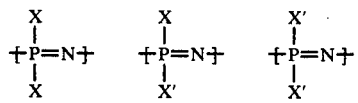

Preparation of [(CH$_2$=CO) (P—ClC$_6$H$_5$O)PN] Polymer

To a 28 oz. bottle was charged 5.12 cc (44 millimoles) of acetophenone, 100 cc of THF, 4.43 cc (44 millimoles) of p-chlorophenol, 12.3 cc (88 millimoles) of triethylamine and 44.6 grams (40.2 millimoles) of a 10.85 percent solids solution of poly(dichlorophosphazene) in cyclohexane. The bottle was heated for 68 hours at 120° C. At the end of this time period, no P-Cl could be detected at 600 cm$^{-1}$ although a carbonyl band at 590 cm$^{-1}$ caused strong interference in this determination. New bands at 562, 538 and 475 cm$^{-1}$ were observed.

A 10 cc portion of this solution was added to a test tube containing 10 cc of a 0.06 M benzoyl peroxide solution in chloroform. After removal of the solvents with a N$_2$ purge, the sample was dried with a vacuum of less than 0.02 mm of Hg, purged with N$_2$ and heated for 45 minutes at 120° C. to produce a solvent resistant (i.e. THF insoluble) film.

What is claimed is:

1. A method of preparing polyphosphazene polyphosphazene polymers comprised of units represented by the formulas:

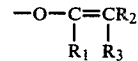

wherein X is $$-O-C=CR_2$$
$$\phantom{-O-}|\phantom{=C}|$$
$$\phantom{-O-}R_1\phantom{=}R_3$$

in which R$_1$, R$_2$, and R$_3$ are independently selected from a group consisting of hydrogen, substituted and unsubstituted alkyl radicals containing from 1 to 15 carbon atoms, and substituted and unsubstituted cycloalkyl, aryl, arylalkyl, and heterocyclic radicals; and wherein X' is selected from a group consisting of substituted and unsubstituted alkoxy, aryloxy, mercapto and amino radicals, or mixtures thereof; said method comprising reacting a poly(dichlorophosphazene) polymer having a formula —(NPCl$_2$)$_n$—, where n is from 20 to 50,000 with a first compound selected from the group consisting of an aldehyde containing at least two carbon atoms, a ketone, a mixture of aldehydes or ketones, and a mixture of an aldehyde and a ketone, and a second compound selected from a group consisting of substituted and unsubstituted alkanol, aryl alcohol, amines and mercaptans or mixtures thereof, in the presence of a tertiary amine.

2. The method of claim 1 wherein the first compound is acetaldehyde.

3. The method of claim 1 wherein the first compound is propionaldehyde.

4. The method of claim 1 wherein the first compound is acetone.

5. The method of claim 1 wherein the first compound is acetophenone.

6. The method of claim 1 wherein the second compound is trifluoroethanol.

7. The method of claim 1 wherein the first compound is a mixture of acetaldehyde and propionaldehyde and the second compound is trifluoroethanol.

8. The method of claim 1 wherein the tertiary amine is triethylamine.

* * * * *